United States Patent Office 3,403,134
Patented Sept. 24, 1968

3,403,134
PROCESS FOR PREPARING COPOLYMERS OF TRIOXANE WITH ALICYCLIC OLEFINICALLY UNSATURATED HYDROCARBONS AND RESULTANT PRODUCT
Walter Wilson, Cambridge, England, and Herbert May, New York, N.Y., assignors, by mesne assignments, to British Industrial Plastics Limited, Asbestos House, Manchester, England
No Drawing. Continuation-in-part of application Ser. No. 640,429, May 22, 1967, which is a continuation-in-part of application Ser. No. 177,256, Mar. 5, 1962. This application July 20, 1967, Ser. No. 654,688
8 Claims. (Cl. 260—73)

ABSTRACT OF THE DISCLOSURE

This invention concerns the preparation of high molecular weight oxymethylene copolymers by the copolymerising of trioxan with alicyclic olefinically unsaturated hydrocarbons, especially those having 5 to 10 carbon atoms in the molecule.

---

This application is a continuation-in-part of the application of Walter Wilson and Herbert May, Ser. No. 640,429 filed May 22, 1967, for a Process for Producing Copolymers of Trioxan, Ser. No. 640,429 is in turn a continuation of application Ser. No. 177,256 filed Mar. 5, 1962.

The present invention relates to novel polymeric products which can be obtained from trioxan, and to the prepartion of these polymeric products.

It has been discovered that valuable polymeric products can be prepared by reacting trioxan with alicyclic unsaturated hydrocarbons under substantially anhydrous conditions and in the presence of electrophilic catalysts.

Accordingly, the present invention provides a process for the preparation of valuable polymeric products which comprises reacting trioxan under substantially anhydrous conditions in the presence of an electrophilic catalyst with at least one alicyclic olefinically unsaturated hydrocarbon.

Examples of the olefinically unsaturated hydrocarbons which may be used are cyclopentadiene, beta-pinene, cyclohexene and 4-vinyl-cyclohexene, although this list is not to be taken as exhaustive. It will be seen that these examples are of hydrocarbons with five to ten carbon atoms, having rings which are 5-membered, 6-membered, or bridged with olefinic unsaturation in the ring and/or outside it, and with alkyl, methylene or vinyl groups attached to the ring.

Valuable products may also be obtained by reacting trioxan with at least one alicyclic olefinically unsaturated hydrocarbon and at least one other compound capable of copolymerising with trioxan in the presence of an electrophilic catalyst; such other compounds have already been described in other patent specifications, e.g., U.S. specification No. 3,272,780, and British specifications Nos. 998,479, 1,009,882, 1,022,563 and 1,022,564.

As hereinbefore stated, the reaction is carried out in the presence of an electrophilic catalyst and particularly suitable electrophilic catalysts which can be used in the process of the present invention are:

(1) Metal and metalloidal fluorides, chlorides and a few bromides, belonging to the general class of catalysts which are usually effective as catalysts in the Friedel-Crafts acylation reaction. Boron trifluoride which is a gaseous catalyst and boron trichloride which is a volatile liquid are particularly suitable for processes carried out in the absence of an inert liquid medium. Such catalysts are well described in the literature, for example, in the following articles or books:

N. O. Calloway, Chemical Reviews, 1935, 17, 327–331, 374–377; O. C. Dermer, D. M. Wilson, F.M. Johnson and V. H. Dermer, J. Amer Chem. Soc., 1941, 63, 2881–2883; E. E. Royals, "Advanced Organic Chemistry," published by Constable, London, p. 467; G. W. Wheland, "Advanced Organic Chemistry," second edition, published by Chapman & Hall, London, 1949, pages 80, 83; and V. Migrdichian, "Organic Synthesis," published by Reinhold, New York, 1957, page 628.

Those catalysts most effective in the classical Friedel-Crafts acylation reaction are not always the best in the process of the present invention. We have found that boron trifluoride, stannic chloride and ferric chloride are particularly useful; boron trichloride, stannic bromide, zinc chloride, antimony pentachloride and other compounds which are exemplified later are also effective.

(2) Complexes of catalysts defined in (1) with water and with organic compounds in which the donor atom is oxygen or sulphur, for example alcohols, ethers, carboxylic acids or dialkyl sulphides. Useful catalysts in this range are ether complexes such as the complexes of diethyl ether with boron trifluoride, stannic chloride, stannic bromide, boron trichloride and ferric chloride, and of boron trifluoride with acetic acid, butyl alcohol or water. When the preferred process is carried out i.e., in the presence of an inert liquid medium, it is advantageous for the catalysts to be soluble in this medium; this is particularly the case when the polymerisation is carried out at a temperature below 60° C. The complexes of boron trifluoride with ethers containing more than 7 carbon atoms such as dibutyl and di-isoamyl ethers, which complexes are soluble in solvents such as hexane, are, therefore, particularly suitable.

(3) Nonoxidising inorganic acids and the complexes thereof with boron trifluoride. Examples are dihydroxyfluoroboric acid, polyphosphoric acid and its complex with boron trifluoride and the complex of boron trifluoride with phosphoric acid.

(4) Complexes of boron trifluoride with very weakly basic nitrogen compounds, in which complexes the nitrogen atom is the donor atom. Examples are the complexes with diphenylamine and N-phenyl 1- or 2-naphthylamine and acetamide. The complexes of boron trifluoride with stronger bases such as ammonia and aliphatic amines are, however, useless as catalysts in the process of the present invention.

(5) Halogens and interhalogen compounds, for example, bromine, iodine, iodine monobromide, iodine monochloride and iodine trichloride.

(6) Oxonium salts. Examples are trialkyloxonium borofluorides such as triethyloxonium borofluoride ($Et_3O^+BF_4^-$), triethyloxonium tetrachloro-aluminate ($Et_3O^+AlCl_4^-$) and triethyloxonium hexachloroantimonate ($Et_3O^+SbCl_6^-$). These and other suitable oxonium salts may be prepared, for example, by the methods described by H. Meerwein, E. Battenberg, H. Gold, E. Pfeil and C. Willfang in J. Prakt. Chem., 1939, 154, 83–156.

The reaction is preferably effected in the presence of an inert liquid medium. This inert medium, which should be well dried, enables the reaction to be carried out in a controlled manner by ensuring uniform distribution of the catalyst and reactants and by facilitating dissipation of the heat of reaction. The use of a liquid medium is also advantageous in giving the product in the form of an easily handled slurry. The inert liquid medium may be one in which the trioxan, the alicyclic unsaturated hydrocarbon, other reactants, if any, and the catalyst are dissolved at the temperature employed. One or more of the reactants (trioxan, alicyclic unsaturated hydrocarbon, other reactants and catalyst) may, however, be dispersed or partly dispersed and partly dissolved in a finely divided form in the liquid medium. Examples of suitable inert liquid media are saturated aliphatic and cycloaliphatic hydrocarbons, chlorinated aliphatic and cycloaliphatic hydrocarbons such as dichloromethane and aliphatic and aromatic nitro-hydrocarbons. Particularly advantageous results have been obtained using n-hexane which dissolves a minor proportion of the trioxan and light petroleum fractions in the hexane range which have a boiling point between 60 and 70° C. and which consist mainly of normal paraffins have also been used with success.

If the alicyclic unsaturated hydrocarbon, and other reactants if used, are soluble in or miscible with molten trioxan, the reaction may be effected without the use of an inert liquid medium, at temperatures high enough for this to occur.

The reaction will generally be carried out at a temperature between —100° C. and 100° C., preferably 0°–80° C. and more preferably between 40° and 70° C. The amount of alicyclic unsaturated hydrocarbon, and other reactants if used, may be vary from 0.1 to 20% by weight based on the total weight of reactants, but the preferred amount is from 0.5 to 20% by weight or more preferably 1 to 5% by weight, on the same basis. About 2½% by weight has proved particularly satisfactory. As hereinbefore stated, the reaction must be carried out under substantially anhydrous conditions and most satisfactory results are obtained when the water content of the reaction system is less than 0.1%, preferably less than 0.05% by weight.

As the reaction proceeds, fresh trioxan, alicyclic unsaturated hydrocarbon and other reactant(s), if any, may be continuously or progressively introduced into the reaction zone in which the catalyst is already present or into which the catalyst is likewise continuously or progressively introduced. If desired, the reaction can be carried out as a completely continuous process by continuously or progressively withdrawing the polymeric product which is produced.

The reaction is preferably carried out under a dry inert atmosphere such as nitrogen and/or carbon dioxide, and suitably at atmospheric pressure, although higher pressures may be employed.

It should be noted that some alicyclic unsaturated hydrocarbons may be partially polymerised prior to their reaction with the trioxan. This can conveniently be effected by partially polymerising the alicyclic unsaturated hydrocarbon in solution with the catalyst in an inert liquid medium, such as hexane, and then adding the solution of alicyclic unsaturated hydrocarbon partial polymer containing the catalyst to a dispersion of trioxan in an inert liquid medium, such as hexane. When certain other compounds capable of copolymerising with trioxan are reacted with trioxan and alicyclic unsaturated hydrocarbons in accordance with the present invention, these compounds may be partially polymerised or partially reacted with trioxan or the alicyclic unsaturated hydrocarbons prior to the introduction into the reaction zone of the other reactant or reactants. For instance, 1,3-dioxolan may be partially polymerised with the catalyst in solution in cyclohexane or dispersed in n-hexane and and the resulting solution and/or dispersion of the partially polymerised cyclic ether containing the catalyst then added to a solution or dispersion of trioxan and an alicyclic unsaturated hydrocarbon in an inert liquid medium such as n-hexane. The reaction of alicyclic unsaturated hydrocarbons with partially polymerised trioxan has, however, proved difficult in view of the rapidity of the polymerisation reaction of trioxan.

At the end of the reaction, an organic solvent such as acetone or dichloromethane or an aqueous solution of a complexing agent suitable for the particular metallic or metalloidal ion may be added and the polymeric product filtered off and washed with more solvent or solution. The purpose of this washing is to remove any unreacted trioxan, alicyclic unsaturated hydrocarbon and/ or other reactants which may thus be recovered, and to remove at least part of the catalyst residues.

It is valuable to effect a substantially complete removal of catalyst residues from the polymeric material and this removal can advantageously be carried out by reducing the polymeric product into a finely divided state suitably by ball-milling in the presence of an extraction liquid for the catalyst residues which are free, for example, by milling. The extraction liquid may be an organic solvent, for example acetone or dichloromethane in which the catalyst dissolves, or it may be a solution of a complexing agent for the metallic or metalloidal ions of the catalyst, for example ammonia or hydrazine, or a sequestering agent. More details of the factors which govern the selection of a suitable extraction liquid and of the removal of catalyst residues are given in British Patent specification No. 1,009,884, and from this specification it will be seen that the catalyst removal process should leave the product in either a neutral or slightly alkaline condition. It is for this reason that, if a strongly alkaline or acidic extraction liquid is used to remove the metallic or metalloidal part of the catalyst residue, it is essential to render the treated polymeric product neutral or slightly alkaline by removing all traces of acid and caustic alkali. This can conveniently be done by giving the product a final treatment with a hot dilute aqueous solution of a weak base, such as ammonia, triethanolamine, hydrazine or an amine.

The thermal stabilities of the products of the present invention, as expressed by the rate of loss of weight at 222° C. ($K_{222}$) measured by the method described by Schweitzer, Macdonald & Punderson in the Journal of Applied Polymer Science, 1959, 1, 160, are such that in some cases the product can be used without further stabilisation. However, some products do require such stabilisation and others benefit by such stabilisation insofar as their initial thermal stabilities, as determined by the percentage loss of weight during the first thirty minutes of heating at 222° C., are improved. It is important for the products to have a high initial thermal stability, if they are to be moulded, for satisfactory mouldings to be obtained by conventional moulding processes.

Such further stabilisation of the products can be obtained by incorporating therein substances which react with any free end groups, and typically reactive substances for this purpose are identified in U.K. Patent Specification No. 577,873 and include acid anhydrides and isocyanates. The products of the present invention are preferably stabilised by the incorporation therein of antioxidants, for example 2-methyl-4,6-di-tert-butyl phenol and aromatic amines such as N-phenyl-1-naphthylamine, N-phenyl-2-naphthylamine, diphenylamine and di-2-naphthyl-p-phenylene-diamine; ultra-violet light absorbing substances, for example substituted benzophenones such as 2,2'-dihydroxy-4,4'-dimethoxy-benzophenone and 2-hydroxy-4-methoxy-benzophenone; and substances capable of reacting with formaldehyde, for example hydrazines, ureas and thioureas such as ethylene urea and phenyl thiourea, phenols and polyamines.

Further stabilisation of the products may be effected by the incorporation therein of a polymeric substance containing —CO—NH— groups in accordance with the process described in British Patent Specification No. 1,009,883. Examples of suitable polymeric substances which can be used for this purpose are polyurethanes, polyureas, polyacrylamides and polypeptides.

Although the polymeric products stabilised by the above methods can usefully be used for the production of plastic moulding compositions, films, fibres and protective coatings, they may possess the disadvantage to a varying degree of evolving gas during normal injection moulding. This liberation of gas causes the formation of bubbles and faults in moulded products and, in order to avoid this evolution of gas, it is advantageous to give the product a heat treatment in accordance with the process described in British Patent Specification No. 1,009,881.

The polymers of the present invention are useful industrial products which in many respects resemble the high molecular weight polyoxymethylenes described in U.S. Patent Specification No. 2,768,994. As such they are useful in the manufacture of plastic moulding compositions, films, fibres and protective coatings and, for such applications, the products may be mixed with lubricants, fillers and pigments in addition to the antioxidants and stabilisers hereinbefore mentioned. As is well known (see, e.g., "The Textbook of Polymer Chemistry," by F. W. Billmeyer Jr., Interscience, New York, 1957, page 1) polymers useful for such purposes have molecular weights between 10,000 and 1,000,000. As is also well known there is an approximate relation between the average molecular weight of a particular class of polymer and the inherent viscosity of that polymer as measured in a particular solvent at a particular dilution and particular temperature; consequently inherent viscosity is commonly used as an approximate indication of molecular weight, and it is so used in this specification. As compared with oxymethylene homopolymers, the products of the present invention have improved thermal stability and improved resistance to degradation by alkalis. This indicates that they are copolymers consisting mainly of oxymethylene groups with groups derived from the alicyclic olefinically unsaturated hydrocarbon randomly dispersed along the polymer chain.

The invention is illustrated by the following examples in which the thermal decomposition rates ($K_{222}$ values) were determined by the method described by Schweitzer et al. in the aforementioned journal and in which the inherent viscosities are as measured at 60° C. as 0.5% by weight solutions in p-chlorophenol containing 2% by weight alpha-pinene.

In order to obtain a good product, it is desirable that the reactants be in a high state of purity. As commercial trioxan normally contains traces of acids such as formic acid, it is important to purify it before using it in the process of the invention. It has been found that simple fractional distillation or crystallisation is insufficient to remove these traces of acid but that they can be removed by fractional distillation of the trioxan in the presence of certain basic substances, such as sodium hydroxide, potassium hydroxide and amines having a high boiling point, for example stearylamine. Generally, about 0.1 to 0.5% by weight of such basic substances is sufficient. The trioxan which was used in the following examples was purified in this manner. The other reagents which were used were purified by fractional distillation, the hexane being obtained by fractional distillation of commercial hexane (B.P. 66–68° C.).

EXAMPLE 1

A 2 litre reaction flask fitted with a thermometer, a stirrer, a gas inlet and outlet and a condenser was heated to remove any moisture which was present and then cooled in a stream of pure dry nitrogen. Into the flask there were then charged 600 g. trioxan, 400 g. hexane and 6 g. beta-pinene, the water content of this reaction mixture being less than 0.02% by weight as determined by the Karl Fischer method.

To the mixture, which was rapidly agitated, there was then added in an atmosphere of dry nitrogen 1.0 ml. boron trifluoride-diethyl etherate. Polymerisation took place rapidly and the completion of the reaction was indicated by a drop in temperature.

After completion of the polymerisation, 300 ml. acetone containing 10 ml. triethylamine were added with vigorous agitation. The resulting slurry was filtered and ball-milled for 16 hours with 1200 ml. distilled water containing 60 ml. 0.880 ammonia. The polymeric product was then filtered, washed out with about 2 litres of approximately 0.3% by volume hot aqueous ammonia and then once with about 2000 ml. of acetone and finally dried in a vacuum oven at 60° C.

A film was obtained by compression moulding the polymeric product at 180° C.

EXAMPLE 2

A 100 ml. reaction flask fitted with a thermometer, a stirrer, a gas inlet and outlet and a condenser was heated to remove any moisture which was present and then cooled in a stream of pure dry nitrogen. Into the flask there were then charged 20 g. trioxan, 10 g. cyclohexane and 0.5 g. cyclopentadiene, the water content of this reaction mixture being less than 0.01% by weight as determined by the Karl Fischer method.

The reaction mixture was heated to 60° C. and maintained at this temperature in an atmosphere of dry nitrogen and, to the reaction mixture, which was rapidly agitated, there was added 0.02 ml. boron trifluoride-diethyl etherate. Polymerisation took place rapidly. After the reaction mixture had cooled to 50° C., about 50 ml. acetone containing about 10% by volume triethylamine were added with vigorous agitation. The resulting slurry was filtered and the polymeric product washed twice with about 250 ml. acetone, once with about 250 ml. of an approximately 2% by weight aqueous ammonia solution and once with about 250 ml. acetone and finally dried in a vacuum oven at 60° C. to constant weight.

A film compression moulded at 190° C. from the polymeric product obtained had a thermal decomposition rate of 0.58% per minute.

EXAMPLE 3

A 100 ml. reaction flask fitted with a thermometer, a stirrer, a gas inlet and outlet and a condenser was heated to remove any moisture which was present and then cooled in a stream of pure dry nitrogen. Into the flask there were then charged 20 g. trioxan, 10 g. cyclohexane and 0.5 g. 4-vinyl cyclohexene, the water content of this reaction mixture being less than 0.01% by weight as determined by the Karl Fischer method.

The reaction mixture was heated to 60° C. and maintained at this temperature in an atmosphere of dry nitrogen and, to the reaction mixture, which was rapidly agitated, there was added 0.02 ml. boron trifluoride-diethyl etherate. Polymerisation took place rapidly. After the reaction mixture had cooled to 50° C., about 50 ml. acetone containing about 10% by volume triethylamine were added with vigorous agitation. The resulting slurry was filtered and the polymeric product washed twice with about 250 ml. acetone, once with about 250 ml. of an approximately 2% by weight aqueous ammonia solution and once with about 250 ml. acetone and finally dried in a vacuum oven at 60° C. to constant weight.

A polymeric product having an inherent viscosity of 1.06 (indicative of a molecular weight in the range 11,000 to 26,000) was obtained, the yield being approximately 60% by weight.

A film compression moulded at 190° C. from this product was flexible and had a thermal decomposition rate of 0.83% per minute.

What we claim is:

1. A process for the preparation of a high molecular weight oxymethylene copolymer suitable for moulding in which the majority of the units are oxymethylene units, which comprises reacting trioxan at a temperature between −100° C. and 100° C. with at least one alicyclic olefinically unsaturated hydrocarbon having up to 10 carbon atoms in the molecule or a partial polymer thereof in an amount of 0.1 to 20% by weight, based on the total weight of trioxan and said hydrocarbon, the polymerisation reaction being effected by means of an electrophilic catalyst and the water content of the reaction mixture being less than 0.1% by weight.

2. A process according to claim 1 in which the alicyclic olefinically unsaturated hydrocarbon has from 5 to 10 carbon atoms in the molecule.

3. A process according to claim 1 in which trioxan is reacted with at least one hydrocarbon selected from the class consisting of cyclopentadiene, cyclohexene, 4-vinyl-cyclohexene and beta-pinene.

4. A process according to claim 1 in which the alicyclic olefinically unsaturated hydrocarbon is reacted in an amount of 0.5 to 20% by weight, based on the total weight of trioxan and said hydrocarbon.

5. A process according to claim 1 in which trioxan is reacted with at least one hydrocarbon selected from the class consisting of alicyclic olefinically unsaturated hydrocarbons having up to 10 carbon atoms in the molecule and with at least one other compound selected from the class consisting of cyclic ethers, cyclic esters, vinyl ethers and allyl ethers.

6. A process according to claim 1 in which said reaction is carried out under a dry inert atmosphere, in which said inert atmosphere comprises at least one gas selected from the class consisting of nitrogen and carbon dioxide, and in which said reaction is carried out in the presence of an inert liquid medium selected from n-hexane and light petroleum fractions in the hexane range which have a boiling point between 60° C. and 70° C. and which consist mainly of normal paraffins.

7. A process according to claim 1 in which said electrophilic catalyst is a catalyst selected from the class consisting of metallic and metalloidal fluorides, chlorides and bromides, and complexes thereof with a compound selected from the class consisting of water and organic compounds, the donor atoms of said organic compounds being selected from the class consisting of oxygen and sulphur; nonoxidising inorganic acids and the complexes thereof with boron trifluoride; complexes of boron trifluoride with very weakly basic nitrogen compounds in which the nitrogen atom is the donor atom; halogens and interhalogen compounds; and oxonium salts.

8. A high molecular weight trioxan-alicyclic olefinically unsaturated hydrocarbon oxymethylene copolymer suitable for moulding produced in accordance with the process of claim 1.

References Cited

UNITED STATES PATENTS

| | | | |
|---|---|---|---|
| 2,274,749 | 3/1942 | Smyers | 260—73 |
| 2,373,561 | 4/1945 | Hanford | 260—73 |
| 3,087,713 | 4/1963 | Kray et al. | 260—73 |
| 3,344,120 | 9/1967 | Rosen | 260—73 |
| 3,355,432 | 11/1967 | Kiss | 260—73 |

OTHER REFERENCES

Okamura et al.: "Isotopes and Radiation," vol. 3, No. 3, 1960, pages 242–243.

JAMES A. SEIDLECK, *Primary Examiner.*